United States Patent [19]

Lloyd

[11] Patent Number: 5,767,514
[45] Date of Patent: Jun. 16, 1998

[54] SCANNING PROBE AND AN APPROACH MECHANISM THEREFOR

[76] Inventor: Grongar Wynn Lloyd, 26 Mill Street, Warwick, CV34 4HB, United Kingdom

[21] Appl. No.: 775,417

[22] Filed: Dec. 31, 1996

[51] Int. Cl.⁶ .................................................. H01J 37/04
[52] U.S. Cl. .................................................. 250/306
[58] Field of Search ................................. 250/306, 307; 73/105

[56] References Cited

U.S. PATENT DOCUMENTS

| | | | |
|---|---|---|---|
| 4,880,975 | 11/1989 | Nishioka et al. | 250/306 |
| 5,198,715 | 3/1993 | Elings et al. | 250/306 |
| 5,200,617 | 4/1993 | Hayes et al. | 250/306 |
| 5,296,704 | 3/1994 | Mishima et al. | 250/306 |

FOREIGN PATENT DOCUMENTS

0421437A2  4/1991  European Pat. Off. .
0442630A2  8/1991  European Pat. Off. .

*Primary Examiner*—Kiet T. Nguyen
*Attorney, Agent, or Firm*—Paul E. Milliken; Lee A. Germain

[57] ABSTRACT

A method and apparatus for tunnelling microscopy utilising a tunnelling microscope head (11) having a tip (15) which is moveable by a driver (25) towards a sample (28) and is stopped in its advance as an electron flow between the tip and the sample is detected. The tip (15) is advanced towards the sample via a piezoelectric member (24) at a one voltage level, and on detection of the electron flow the voltage level of the piezoelectric member (24) is changed causing the piezoelectric member (24) to retract, stopping the advance of the tip (15) and stopping the driver (25) within the retraction distance.

15 Claims, 1 Drawing Sheet

SCANNING PROBE AND AN APPROACH MECHANISM THEREFOR

FIELD OF INVENTION

This invention relates to scanning probes and in particular to tunnelling microscopes and more particularly but not exclusively to scanning tunnelling microscopes.

BACKGROUND OF INVENTION

The tunnel effect is a sub atomic phenomenon in which particles, usually electrons, can pass from one material to another when the surfaces of the two materials are extremely close (in atomic terms). This effect is used for measuring distances between atoms A Scanning Probe is an instrument that produces magnified images of a surface by monitoring interactions between a sharp probe and the surface of the material to be examined that is the sample. Examples of probe microscopes include the Scanning Tunnelling Microscope (STM), Atomic Force Microscope (AFM) and the Lateral Force Microscope (LFM). Each of these probe techniques requires that the probe is brought into close proximity with the sample. Typical separations between the tip and sample are of the order of the dimensions of an atom for example 5 Angstroms ($5 \times 10{-}10$ m). At these separations interactions between the probe and sample take place. By including these interactions into a feedback loop as the controlling factor a microscopic image of the surface can be obtained on scanning the probe relative to the sample by, for example, means of a piezoelectric tube scanner or orthogonally mounted piezo device. Such images include in the case of the STM a local density of States for conducting or semi-conducting materials, for the ATM, a contour map of the physical surface. For high resolution, high quality images the tip to sample separation must be kept as vibration free as possible.

Before scanning with the probe in close proximity to the sample, the probe must first brought into the scanning position from an initial tip separation in the order of 3–5 mm ($3{-}5 \times 10{-}3$ m) without contacting the sample and destroying the probe tip. An approach mechanism capable of moving the probe over a range of several millimeters with the capability of stopping within an atomic distance of the surface is therefor required.

A number of ways of tackling this problem are currently used. The most common methods being those that use the principle of levers to reduce the rate of approach of the tip to the sample with respect to the approach drive mechanism. Another technique employs the special characteristics of piezoelectric materials to generate a crawling action to reduce the distance between tip and sample in which the separation is reduced by small increments before stopping when interaction with the sample is detected. Both of these techniques r and others, have the disadvantage that in practice the tip to sample control loop is in the order of 10 to 20 cms.

Further, since the tip is used for examining and measuring distances in the order of $m \times 10{-}10$ (Angstroms) and the mechanical loop between the microscope tip and the sample is in the order of 10 to 20 cms ($m \times 10{-}2$) then it will be seen that during the operation of for example, a tunnelling microscope it is necessary to keep vibration from any source to an absolute minimum.

The present invention seeks to provide an approach mechanism suitable for a tunnelling microscope that overcomes the above problems.

STATEMENTS OF INVENTION

Accordingly there is provided a tip approach mechanism for a probe microscope having a tip which is moveable towards a sample, said tip being advanceable towards the surface via a piezoelectric member attached to a drive means and which retracts away from the tip when the tip reaches its operating position, the drive means stopping within the retraction distance.

Preferably the microscope is a scanning tunnelling microscope wherein the mechanism is mounted in a body and the tip is mounted on a piezoelectric scanning tube which is in turn secured to the body. The tip may be held on the scanning tube by frictional engagement and may be connected to the piezoelectric member through a lost motion connection.

Also according to the invention there is provided a probe microscope which includes a tip approach mechanism according to the present invention, and wherein the microscope has a voltage source for the piezoelectric member, said voltage source is controllably linked to a tip operation detect means so that the voltage source to the piezoelectric member is changed as electron flow between the tip and the sample is detected, causing the piezoelectric member to retract.

When the piezoelectric member is attached to a screw threaded member and is advanced by rotation of the screw threaded member by a motor, the microscope may include a control means which switches off the motor on detection of the electron flow.

Also according to the invention there is provided a method of tunnelling microscopy utilising a tunnelling microscope having a tip which is moveable by a drive means towards a sample to be examined and is stopped in its advance as an electron flow between the tip and the sample is detected, characterised in that the tip is advanced towards the sample through a piezoelectric member at a first voltage level, and on detection of said flow the voltage level of the piezoelectric member is changed to a second voltage level causing the member to retract, stopping the advance of the tip and stopping the drive means within the retraction distance.

DESCRIPTION OF DRAWINGS

The invention will be described by way of example and with reference to the accompanying drawing in which.

DETAILED DESCRIPTION OF INVENTION

Figure 1:
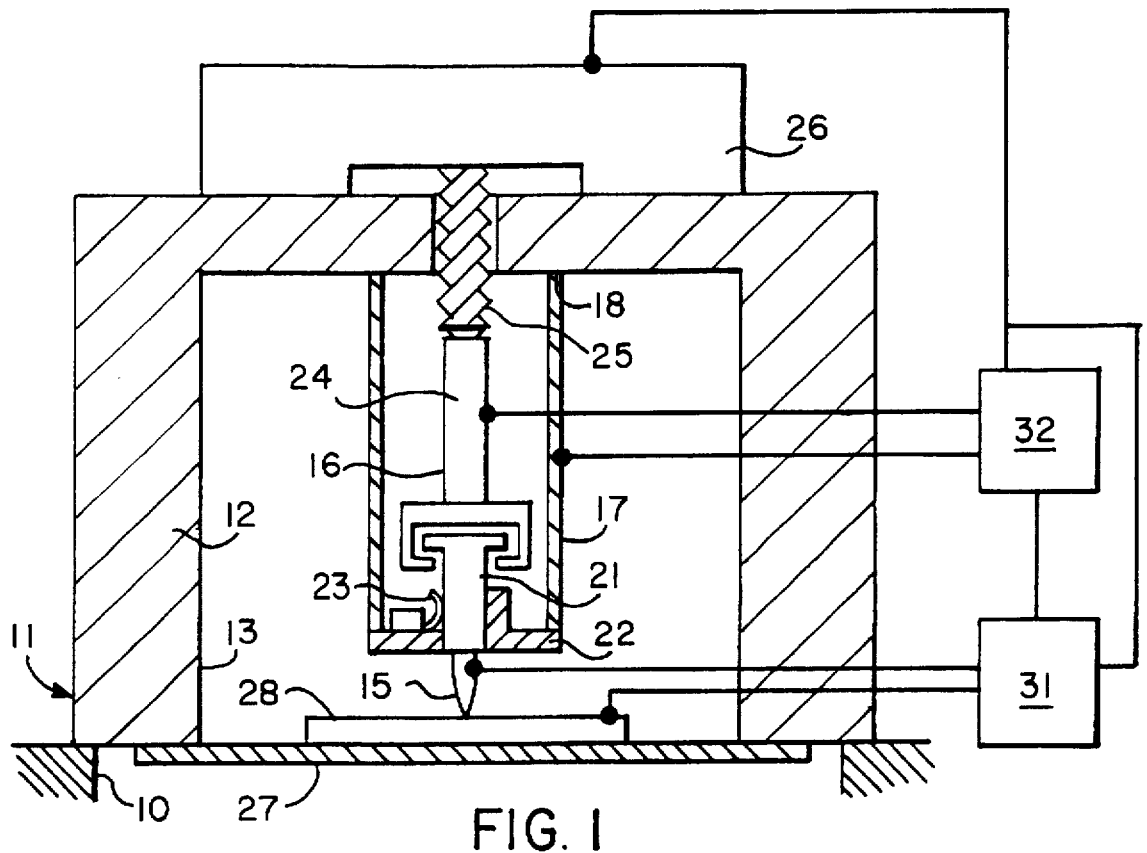
FIG. 1 is a section through a scanning tunnelling microscope head according to the invention, and shows schematic drawing of the microscope controls.
Figure 2:
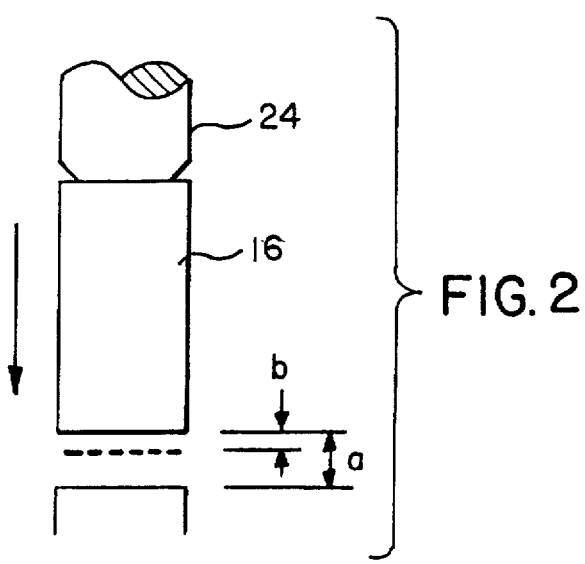
FIG. 2 is a schematic view of the operation of the piezo electric member.

With reference to FIGS. 1 and 2 of the drawings there is shown a scanning tunnelling microscope head (11) which in use may be secured to the flange (10) of a tube attached to an ultra high vacuum chamber. The head comprises a body (12) which is formed from a suitable metal e.g. stainless steel, bronze, tungsten steel.

The body may be square, or round, and has a coaxial center bore (13) closed at one end and which is open at its underside to receive a sample holder (27).

A tip (15) is mounted in a tip assembly (16) which is fixed to the lower end of a cylindrical piezoelectric scanning tube (17). The tip assembly (16) comprises a tin mount (21) onto which the tip (15) is fixed by any suitable means e.g.

adhesive, clamping, screw means etc.... The tip mount (21) is held in a plate (22) by a spring clip (23). Thus the tip mount is held in the assembly (16) by frictional engagement with the plate (22) such that the tip (15) can be moved relative to the plate (22) by the application of a load which overcomes the frictional engagement. The tip can be formed from any suitable electrically conductive metal such as tungsten, or platinum/iridium alloy for operation in vacuum, or gold or platinum/iridium alloy for operation in air.

The scanning tube (17) may be made from a Standard Navy type piezoelectric material such as PZT 5A available from Morgan Matrix Ltd. The upper end of the scanning tube (17) is fixed to a shoulder (18) on the end face of the bore (13) by any suitable means such as adhesive.

A piezoelectric element (24) which may be of the same material as the scanning tube (17) is fixed to one end of a screw threaded strut (25) arranged coaxially in the bore (13) and which passes through said closed end in alignment with the tip (15). The screw threaded strut (25) and element (24) pass through the center of the scanning tube (17) for abutment of the piezo element (24) against the rear end of the tip mount (21). The screw threaded strut (25) is rotatable by a motor (26) to advance or retract the strut (25) towards or away from the tip (15).

The motor (26) may be an electric or hydraulic motor preferably a 10 volt DC electric motor, turning at two revolutions per minute and the pitch of the screw thread of the strut is 0.5 mm. As the motor (26) advances the screw threaded strut (25) with the voltage of the piezo electric element (24) set such that the element is at its fullest extension, the piezoelectric element (24) abuts the tip mount (21) and overcomes the friction between the tip mount (21) and the holder (22) and pushes the tip (15) downwards towards a sample (28).

On detection of a tunnelling current the voltage to the piezoelectric element (24) is altered so as to reduce the length of the element by a distance 'a' in FIG. 2. Simultaneously the electric motor is switched off, thus halting the advance of the tip (15) within a distance 'b', that is less than distance 'a'.

The tip (15) is now held within the tunnelling regime of between 5–20 Angstrom is from the sample and yet not in contact with driven approach mechanism. The tip to sample mechanical loop is reduced to virtually twice the length of the scanning tube (17) i.e. about 2 cms and contains effectively no moving parts.

A sample holder (27) and sample (28) are fixed to the underside of the body (12) by means of a pair of opposed electrically non-conductive slides (not shown) one on each side of the holder. The sample holder (27) is separated from the body (12) by means of an electrically insulating gasket (not shown) formed from ceramic material.

In a scanning electron microscope the tip (15) and the sample (28) will be electrically connected to a detect means (31) which can detect electron flow between the tip (15) and a sample on the sample holder (27). The detect means (31) is connected to a microprocessor control means (32) which is in turn connected to the motor (26), the scanning tube 17, and the piezoelectric element (24).

In a typical operation the head (11) is mounted in a tube (10) of a vacuum chamber with the sample holder (27) placed into position.

The motor (26) will then operate to cause the tip (15) to advance slowly towards the sample. The piezoelectric element (24) will be held at a voltage of say +200 volts. As the tip (15) nears the sample to within a distance of 3–5.×10–10 meters (3–5 Angstroms) the detect means (31) detects the flow of electrons. The control means (32) on receipt of a signal from the detect means (31) firstly changes the voltage to the piezoelectric element (24) from +200 volts to –200 volts and simultaneously switches off the motor (26).

The change in voltage to the piezoelectric element should cause it to retract away from the back of the tip mount (16) by a distance 'a' of between 4–20 microns and typically 15 microns, and the motor (26) should switch off within 1/10th of a second which gives a stopping distance 'b' of 0.0016 mm that is 1.6 microns.

It can be seen that the retraction of the piezoelectric element 24 is greater than the stopping distance required by the motor. Since the shortening or retraction of the piezoelectric element (24) is virtually instantaneous the tip (15) stops advancing instantly and the motor is switched off before the gap opened up between the element (22) and the tip (15) is closed.

Since the sample holder (27) is fixed to the head (11) there is almost no mechanical loop between the tip (15) and the sample. This is a great improvement on the prior art and makes the use of the microscope less susceptible to vibrations.

The piezoelectric element 24 is attached to the tip mount (16) via a lost motion connection 30 in the form of hooks which permit withdrawal of the tip (15) when the motor (26) is put into reverse.

The microscope can be made to scan by the application of voltage to the piezoelectric scanning tube (17) through the control (32). The friction grip between the spring (23) and the tip mount (21) may result in the tip mount being held temporarily stationary and being pushed forward in large step movements as the friction load is overcome. In order to ameliorate this effect the control means (32) applies an oscillating voltage to the scanning tube (17) during the tip approach phase. This causes the tip mount (21) to tap against the end of the advancing screw strut (25) which nudges the tip mount forward in smaller more controlled increments.

A tunnelling microscope head made according to the invention may be used in vacuum, air, or liquid as may be required.

I claim:

1. A tip mechanism for a probe microscope capable of sensing electron flow between a tip and a surface of a sample, said mechanism comprising: a tip, a drive means to move the tip towards a surface of a sample, said tip being moved via a first piezoelectric member attached to the drive means, and when the tip at a distance from said surface begins to detect said electron flow, the first piezoelectric member retracts a predetermined distance and the drive means stops within the predetermined distance.

2. A mechanism as claimed in claim 1, wherein said drive means is a screw threaded member and the first piezoelectric member is secured to the screw threaded member which is rotated to advance the tip.

3. A mechanism as claimed in claim 2, further including a body and an electric or hydraulic motor which is mounted on the body coaxially aligned with the tip, and the screw threaded member is rotated by said motor.

4. A mechanism as claimed in claim 3, further including a second piezoelectric member housed within the body, and wherein the tip is slideably mounted at one end of the second piezoelectric member, the other end of which is secured to the body, the tip being mounted in alignment with the first piezoelectric member.

5. A mechanism as claimed in claim 4, wherein the body has a mounting surface and said sample is mounted onto the mounting surface.

6. A mechanism as claimed in claim 4, wherein the tip is secured to a tip mount which is held on a plate by frictional engagement therewith, said plate being mounted on the second piezoelectric member.

7. A mechanism as claimed in claim 1, wherein the tip is mounted on a tip mount which is connected to the first piezoelectric member through a lost motion connection.

8. A mechanism as claimed in claim 1, wherein said probe microscope is a tunnelling microscope.

9. A mechanism as claimed in claim 1, further comprising a voltage source for producing a voltage which is connected to the first piezoelectric member, and said voltage source is controllably linked to a tip operation detect means to that the voltage is change as electron flow between the tip and the sample surface is detected.

10. A mechanism as claimed in claim 9, wherein the voltage is changed from +200 volts to −200 volts.

11. A mechanism as claimed in claim 10, wherein the first piezoelectric member is retracted by a distance of about between 4–20 microns based on changing voltage.

12. A mechanism as claimed in claim 9, wherein the first piezoelectric member is secured to a screw-threaded member which is rotated, a motor causing the threaded member to advance the tip relative to a body on which the tip is mounted, wherein a control means switches off the motor on detection of electron flow.

13. A method of tunnelling microscopy utilizing a tunnelling microscope having a tip mechanism as claimed in claim 1, said method comprising: advancing the tip towards a surface of a sample, holding the first piezoelectric member at a first voltage level, detecting the flow of electrons between the tip and said surface, changing the voltage level of the piezoelectric member to a second voltage level, causing the first piezoelectric member to retract a distance from the tip, stopping the drive means within the retraction distance.

14. A method as claimed in claim 13, wherein the first piezoelectric member is secured to a screw threaded member which is rotatable to advance the tip via the first piezoelectric member, the method including rotating the screw threaded member by means of a hydraulic or an electric motor operating at approximately up to 2 rpm and stopping the motor within about 0.1 seconds of detecting said electron flow.

15. A method as claimed in claim 13, wherein further including retracting the first piezoelectric member for distance of between 4–20 microns depending upon the change of voltage level from said first to said second levels.

* * * * *